United States Patent
Li

(10) Patent No.: US 11,206,717 B2
(45) Date of Patent: Dec. 21, 2021

(54) SYSTEM FOR CONTROLLING LED LIGHTBOX POWER SUPPLY AND REMOTE CONTROL METHOD THEREOF

(71) Applicant: BLUEVIEW ELEC-OPTIC TECH CO., LTD, Chengdu (CN)

(72) Inventor: Zhongxun Li, Chengdu (CN)

(73) Assignee: BLUEVIEW ELEC-OPTIC TECH CO., LTD., Chengdu (CN)

( * ) Notice: Subject to any disclaimer, the term of this patent is extended or adjusted under 35 U.S.C. 154(b) by 153 days.

(21) Appl. No.: 16/166,165

(22) Filed: Oct. 22, 2018

(65) Prior Publication Data

US 2019/0098727 A1  Mar. 28, 2019

Related U.S. Application Data

(63) Continuation of application No. PCT/CN2016/093155, filed on Aug. 3, 2016.

(30) Foreign Application Priority Data

Jul. 26, 2016  (CN) .......................... 201610593646.4

(51) Int. Cl.
*H05B 45/50*  (2020.01)
*H05B 47/19*  (2020.01)
(Continued)

(52) U.S. Cl.
CPC ............. *H05B 45/10* (2020.01); *H05B 45/50* (2020.01); *H05B 47/105* (2020.01); *H05B 47/19* (2020.01);
(Continued)

(58) Field of Classification Search
CPC ........ H05B 45/10; H05B 47/16; H05B 47/19; H05B 47/12; Y02B 20/42
(Continued)

(56) References Cited

U.S. PATENT DOCUMENTS

2008/0007181 A1* 1/2008 Pickering .................. G09F 9/33
315/82
2011/0267800 A1 11/2011 Tong et al.
(Continued)

FOREIGN PATENT DOCUMENTS

CN 102748725 A 10/2012
CN 203385837 U 1/2014
(Continued)

OTHER PUBLICATIONS

Internation Search Report of PCT/CN2016/093155, dated Apr. 24, 2017.

*Primary Examiner* — Alexander H Taningco
*Assistant Examiner* — Amy X Yang

(57) ABSTRACT

A system for controlling LED lightbox power supplies, comprises the lightbox supplies disposed inside a lightbox and correspondingly connected with LED light bars one by one. All the lightbox power supplies are connected in series with one another via a 485 communication bus. Meanwhile, a wireless communication device connected in series with the lightbox power supplies is further mounted inside the lightbox. A gateway device for wirelessly connecting with the wireless communication device and uploading data acquired to a cloud server, is arranged outside the lightbox. A sensor set connected in a wired manner with the wireless communication device is arranged on an outer wall of the lightbox.

5 Claims, 12 Drawing Sheets

(51) Int. Cl.
  *H05B 47/18*  (2020.01)
  *H05B 45/10*  (2020.01)
  *H05B 47/105* (2020.01)
  *H05B 45/56*  (2020.01)
  *H05B 47/21*  (2020.01)
  *H05B 47/23*  (2020.01)

(52) U.S. Cl.
  CPC .............. *H05B 45/56* (2020.01); *H05B 47/18* (2020.01); *H05B 47/22* (2020.01); *H05B 47/235* (2020.01); *Y02B 20/40* (2013.01)

(58) Field of Classification Search
  USPC ........................................................ 315/297
  See application file for complete search history.

(56) References Cited

U.S. PATENT DOCUMENTS

| | | | |
|---|---|---|---|
| 2011/0267801 A1 | 11/2011 | Tong et al. | |
| 2012/0062133 A1* | 3/2012 | Cubias | H05B 45/37 315/201 |
| 2013/0093357 A1* | 4/2013 | Lee | H05B 45/14 315/297 |
| 2014/0343854 A1* | 11/2014 | Wollard | G09F 13/04 702/3 |
| 2015/0237694 A1* | 8/2015 | Zudrell-Koch | H05B 45/14 315/307 |
| 2015/0264771 A1* | 9/2015 | Lin | H05B 45/10 315/307 |
| 2016/0255697 A1* | 9/2016 | Bhide | F21K 9/232 315/161 |
| 2017/0108235 A1* | 4/2017 | Guan | F24F 11/30 |
| 2018/0203180 A1 | 7/2018 | Horner et al. | |

FOREIGN PATENT DOCUMENTS

| | | | |
|---|---|---|---|
| CN | 103781255 A | 5/2014 | |
| CN | 204669643 U | 9/2015 | |
| CN | 205946256 U | 2/2017 | |
| CN | 205946257 U | 2/2017 | |
| JP | 2013120748 A | 6/2013 | |
| KR | 20120116201 A | 10/2012 | |
| WO | WO-2012069782 A1 * | 5/2012 | ............. H05B 45/22 |

* cited by examiner

SYSTEM FOR CONTROLLING LED LIGHTBOX POWER SUPPLY AND REMOTE CONTROL METHOD THEREOF

CROSS-REFERENCE TO RELATED APPLICATIONS

This application is a continuation of International Patent Application No. PCT/CN2016/093155 with a filing date of Aug. 3, 2016, designating the United States, now pending, and further claims priority to Chinese Patent Application No. 201610593646,4 with a filing date of Jul. 26, 2016. The content of the aforementioned applications, including any intervening amendments thereto, are incorporated herein by reference.

TECHNICAL FIELD

The disclosure relates to an LED (light-emitting diode) lightbox power supply, and particularly relates to a system for controlling an LED lightbox power supply and a remote control method thereof.

BACKGROUND OF THE PRESENT INVENTION

At present, with the development of LED technology, LED products are increasingly applied in an outdoor environment. Especially in advertising industry, the LED products are often mounted outdoors and should work for a long term to improve the advertising propaganda effect. The outdoor environment changes fantastically and the work of the LED products is easily influenced by environmental factors such as weather and temperature, leading to a fact that electronic elements inside are shortened in service life and even frequently malfunction, and hence stop working properly. Once malfunction occurs, it is needed for maintenance personnel to overhaul. However, once installation is completed, the existing LED products just need electrifying to enter a work state; their work states cannot be remotely monitored, so whether the LED products normally work is found only through field observation from maintenance personnel. In this case, the workload of the maintenance personnel is greatly increased in the outdoor application of the LED products, later maintenance cost is increased, and supervision of the LED products cannot achieve instantaneity and has a great lagging problem. Moreover, potential safety hazard cannot be effectively avoided, thereby causing great hinder to the outdoor application of the LED products.

SUMMARY OF PRESENT INVENTION

Aiming at the problem that the existing LED products cannot achieve real-time supervision which is helpful to avoid potential safety hazard, an objective of the disclosure is to provide a system for controlling LED lightbox power supplies.

In order to achieve the above objective, the technical solutions adopted by the disclosure are as follows:

A system for controlling LED lightbox power supplies, comprises the lightbox power supplies disposed inside a lightbox and correspondingly connected with LED light bars one by one; all the lightbox power supplies are connected in series with one another via a 485 communication bus; meanwhile, a wireless communication device connected in series with the lightbox power supplies is further mounted inside the lightbox; a gateway device for wirelessly connecting with the wireless communication device and uploading data acquired to a cloud server is arranged outside the lightbox; a sensor set connected in a wired manner with the wireless communication device is arranged on an outer wall of the lightbox.

Further, the wireless communication device is a Zigbee wireless communication node, and includes a Zigbee radio frequency chip, a four-channel digital isolator connected with the Zigbee radio frequency chip, an alternating-current input parameter detection circuit connected with the four-channel digital isolator, a signal conversion circuit respectively in electric connection with the Zigbee radio frequency chip and the light bars and a first supply circuit respectively connected with the Zigbee radio frequency chip, the four-channel digital isolator, the alternating-current input parameter detection circuit and the signal conversion circuit.

Furthermore, the sensor set includes a temperature and humidity sensor, an illumination detection circuit, a clock module and a storage module which are respectively connected with the Zigbee radio frequency chip, and the temperature and humidity sensor, the illumination detection circuit, the clock module and the storage module are also respectively connected with the first supply circuit.

Furthermore, each of the lightbox power supplies comprises a conversion circuit for converting a serial port signal into a 485 communication signal, a voltage detection circuit for detecting output voltage of the lightbox power supply, a current detection circuit for detecting output current of the lightbox power supply, a microprocessor for processing detection results of the voltage detection circuit and the current detection circuit, and a second supply circuit connected with the microprocessor.

Preferably, the voltage detection circuit comprises a MOSFET (Metal-Oxide-Semiconductor Field Effect Transistor) for light intensity adjustment and a driving circuit of the MOSFET for light intensity adjustment.

Preferably, the microprocessor is further connected with a drive circuit of the MOSFET for light intensity adjustment.

Preferably, the MOSFET for light intensity adjustment is a PWM (pulse-width modulation) four-channel MOSFET for light intensity adjustment.

Meanwhile, the disclosure further provides a remote control method of a system for controlling an LED lightbox power supply, including the following steps:

(1) detecting output voltage and output current of a lightbox power supply in real time by a voltage detection circuit and a current detection circuit, and detecting environment information of a lightbox in real time through a sensor set;

(2) analyzing and determining whether the lightbox power supply malfunctions by a microprocessor according to the output voltage and the output current of the lightbox power supply, and determining whether the lightbox power supply is suitable for continuing work according to the environment information of the lightbox;

(3) converting a serial port signal of the microprocessor into a 485 communication signal by a conversion circuit, and transmitting the determination result of the microprocessor to a gateway device through a wireless communication device, and updating the determination result to an Internet by the gateway device; and (4) registering a server on an Internet by an LED lightbox management party to remotely grasp a current state of the lightbox power supply, and deciding whether to turn off the lightbox power supply according to the determination result of the microprocessor, wherein, maintenance personnel are scheduled for overhauling if the lightbox power supply has malfunctioned.

Preferably, the wireless communication device is a Zigbee wireless communication node.

Preferably, the sensor set includes at least one of the temperature and humidity sensor and the illumination sensor.

Compared with the prior art, the disclosure has the following the beneficial effects:

(1) According to the disclosure, the wireless communication device connected with the lightbox power supply is mounted in the existing LED lightbox, the output voltage and output current determination circuits of the lightbox power supply are added to determine whether the current state of the lightbox power supply is normal, and then a determination signal is wirelessly transmitted to an Internet by utilizing the wireless communication device so that the management party can know whether the lightbox power supply is normal in real time without scheduling maintenance personnel to the work field of the LED lightbox for observation and learning, thereby greatly reducing workload and improving timeliness for determining malfunction of the lightbox power supply.

(2) According to the disclosure, the sensor for detecting environment conditions is mounted outside the LED lightbox for detecting the environment around the LED lightbox, and analysis is performed through the microprocessor inside the lightbox to determine whether the current environment is suitable for the LED lightbox to continue working and then transmit the determination result to an Internet to provide reference for the management party, so that the management party knows the surrounding factors of the LED lightbox in advance and timely processes to avoid possible security risk and prevent components inside the LED lightbox from being damaged due to environment factors.

(3) According to the disclosure, the system for controlling the LED lightbox power supplies is simple in principle and easy for implementation, is automatically monitored during the whole process, is capable of providing timely and effective security guarantee to outdoor application of the LED product, and has a high practical value and a wide promotion and application prospect.

In the above drawings, names of components corresponding to reference numbers are as follows:

1—LED lightbox, 2—LED light bar, 3—lightbox power supply, 4—wireless communication device, 5—gateway device, 6—sensor set, and 7—remote server, 8—Zigbee radio, frequency chip, 9—four-channel digital isolator, 10—alternating-current input parameter detection circuit, 11—signal conversion circuit, 12—first supply circuit, 13—temperature and humidity sensor, 14—illumination detection circuit, 15—clock module, 16—storage module, 17—conversion circuit, 18—voltage detection circuit, 19—current detection circuit, 20—microprocessor; 21—second supply circuit, 22—driving circuit.

DETAILED DESCRIPTION OF PREFERRED EMBODIMENTS

The disclosure will be further described in combination with drawings and examples below, and embodiments of the disclosure include but are not limited to the following examples.

EXAMPLES

Figure 1:
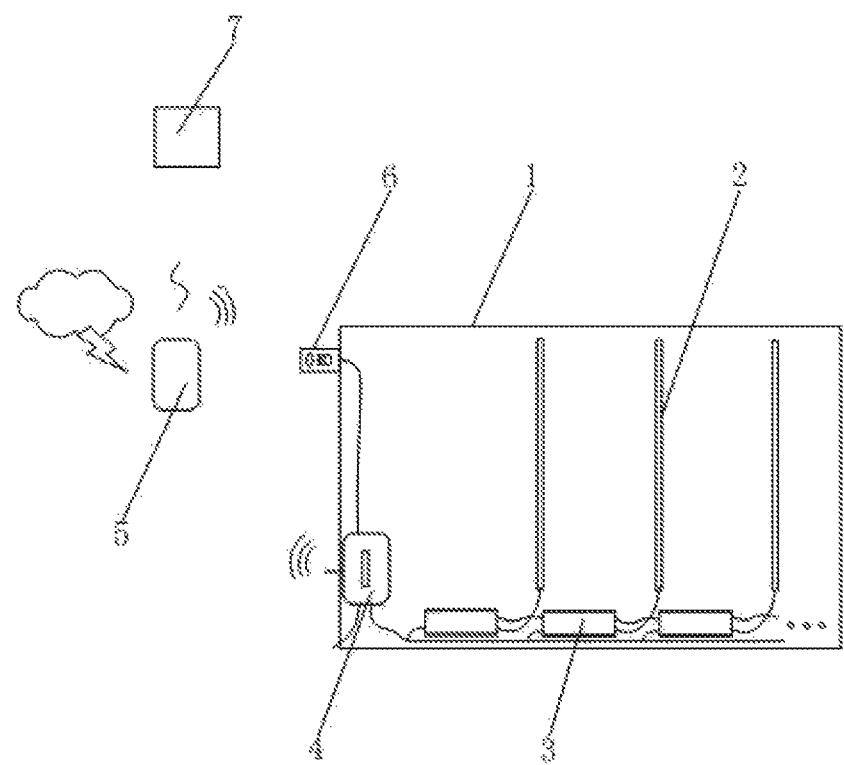
FIG. 1 is a block diagram of a system according to the disclosure.
Figure 2:
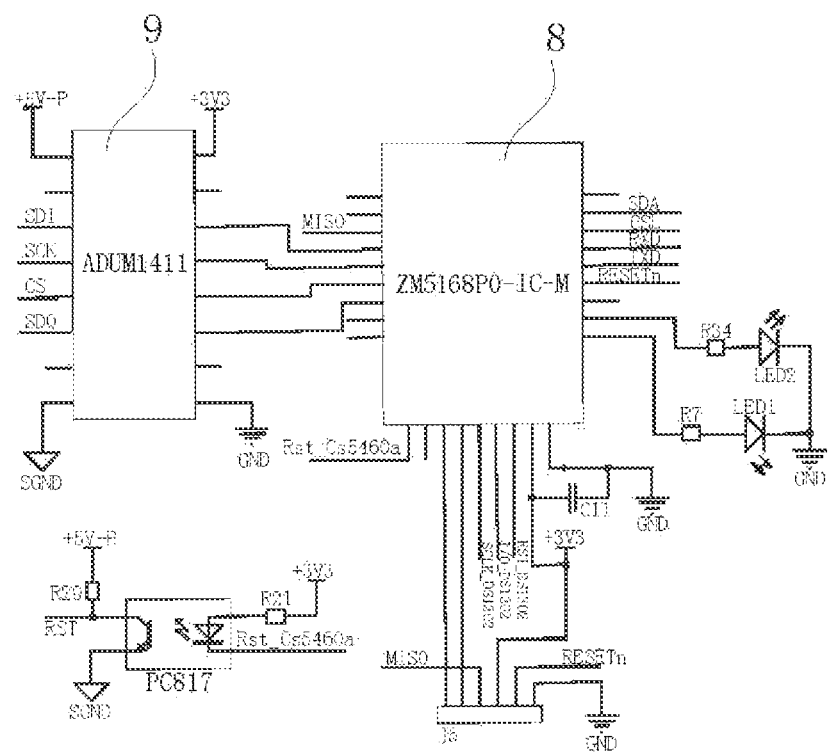
FIG. 2 is a principle diagram of a microprocessor isolating circuit consisting of a Zigbee radio frequency chip and a four-channel digital isolator according to the disclosure.
Figure 3:
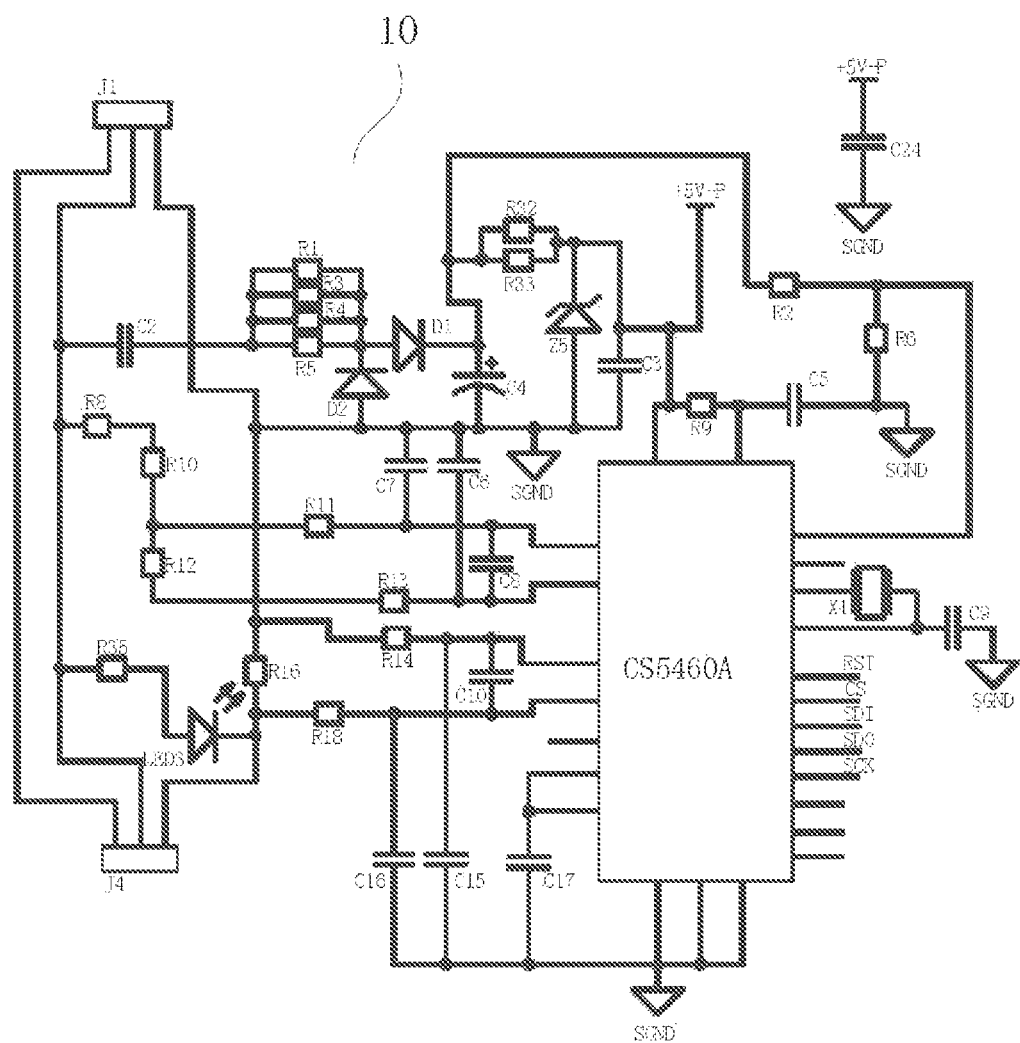
FIG. 3 is a principle diagram of an alternating-current input parameter detection circuit according to the disclosure.
Figure 4:
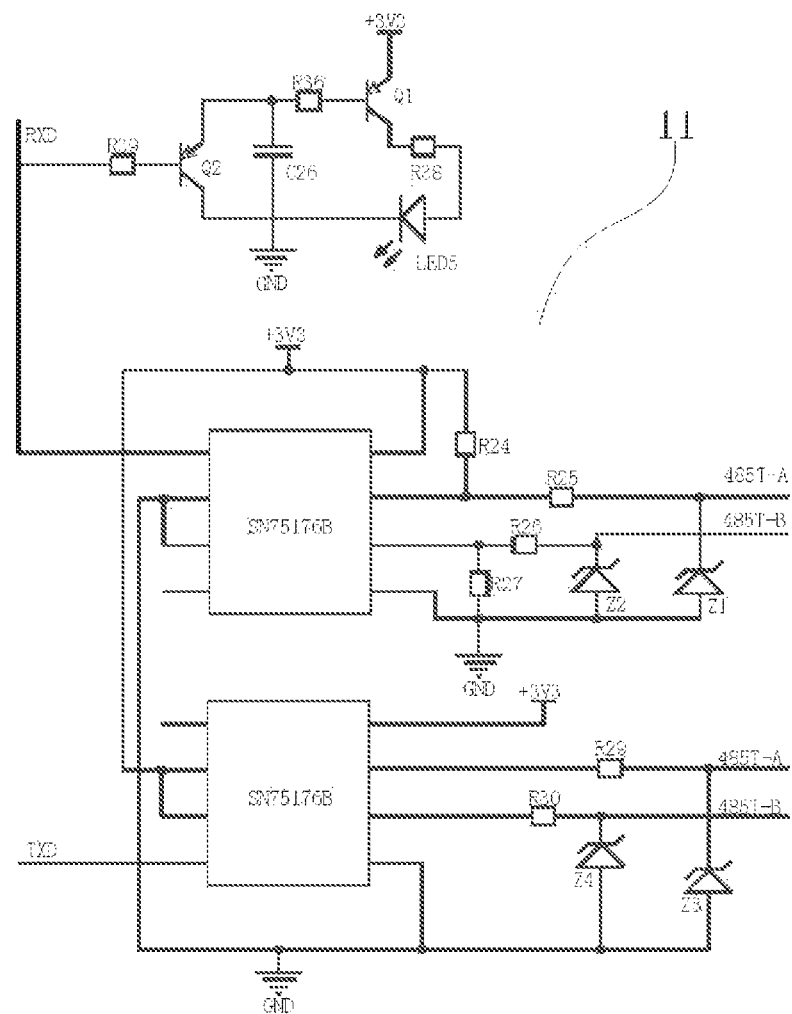
FIG. 4 is a principle diagram of a signal conversion circuit according to the disclosure.
Figure 5:
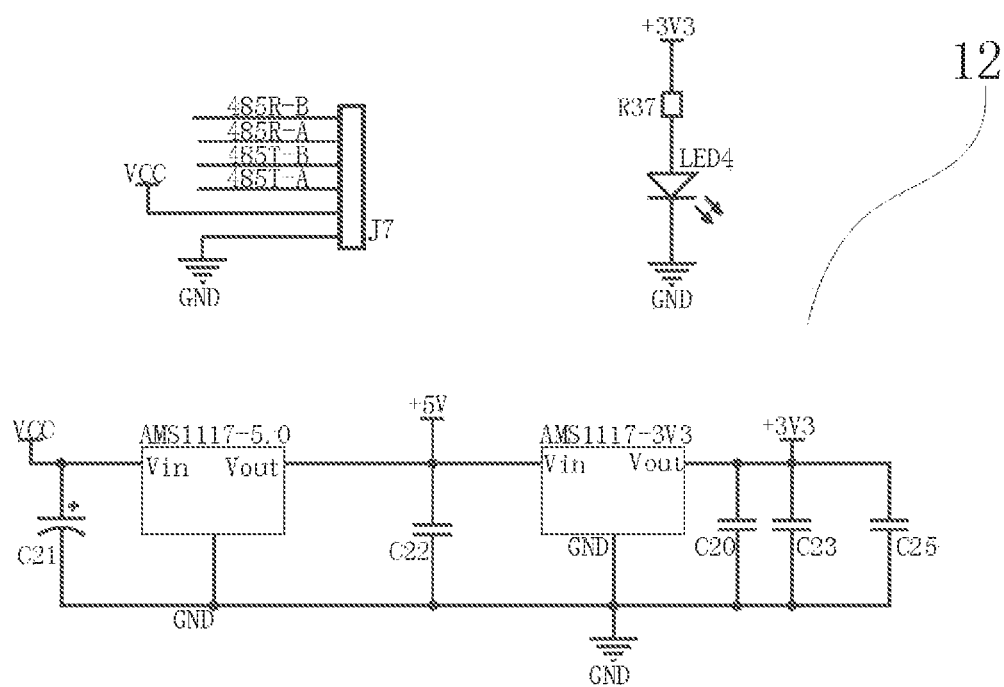
FIG. 5 is a principle diagram of a first supply circuit according to the disclosure.
Figure 6:
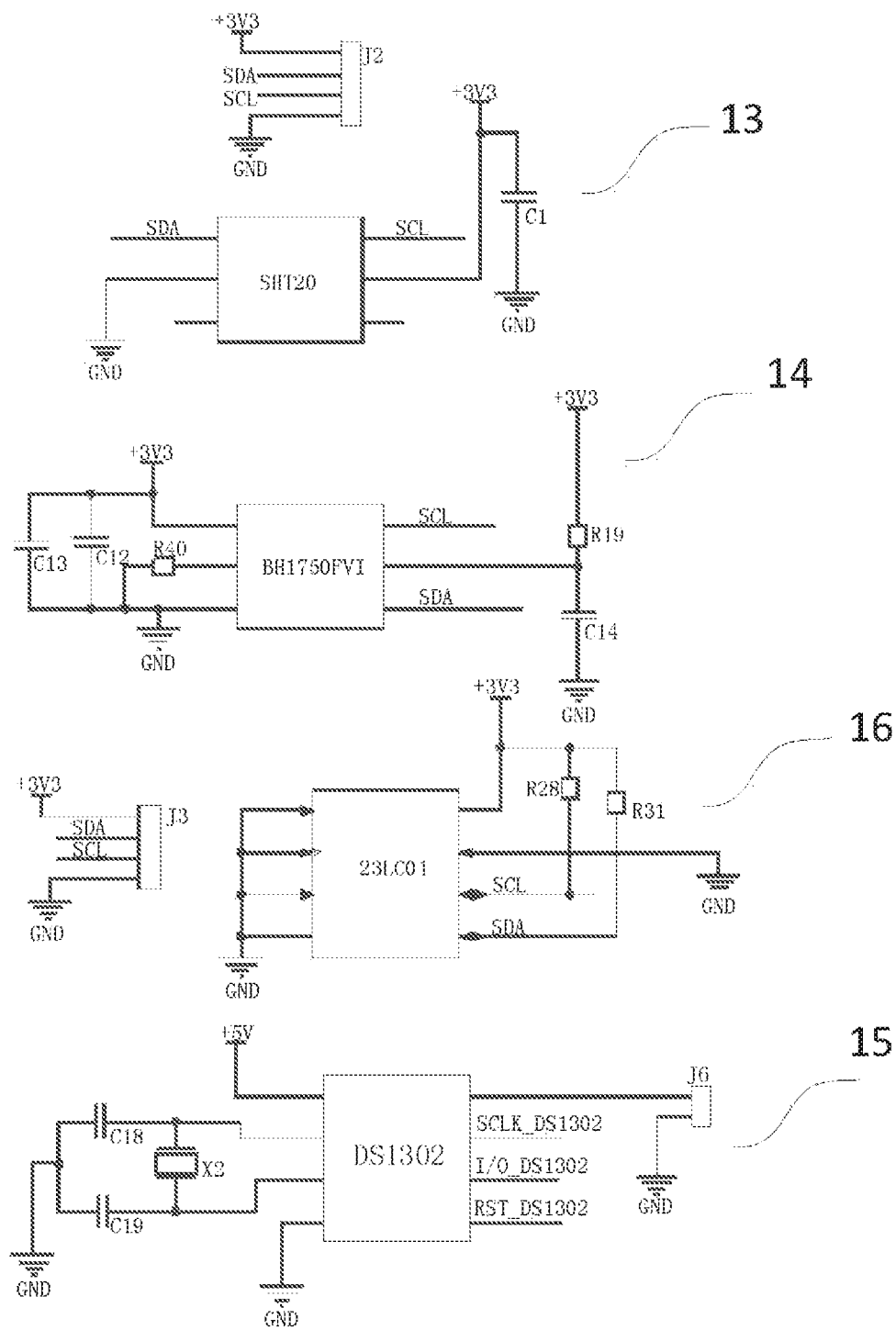
FIG. 6 is a principle diagram of a sensor set according to the disclosure.
Figure 7:
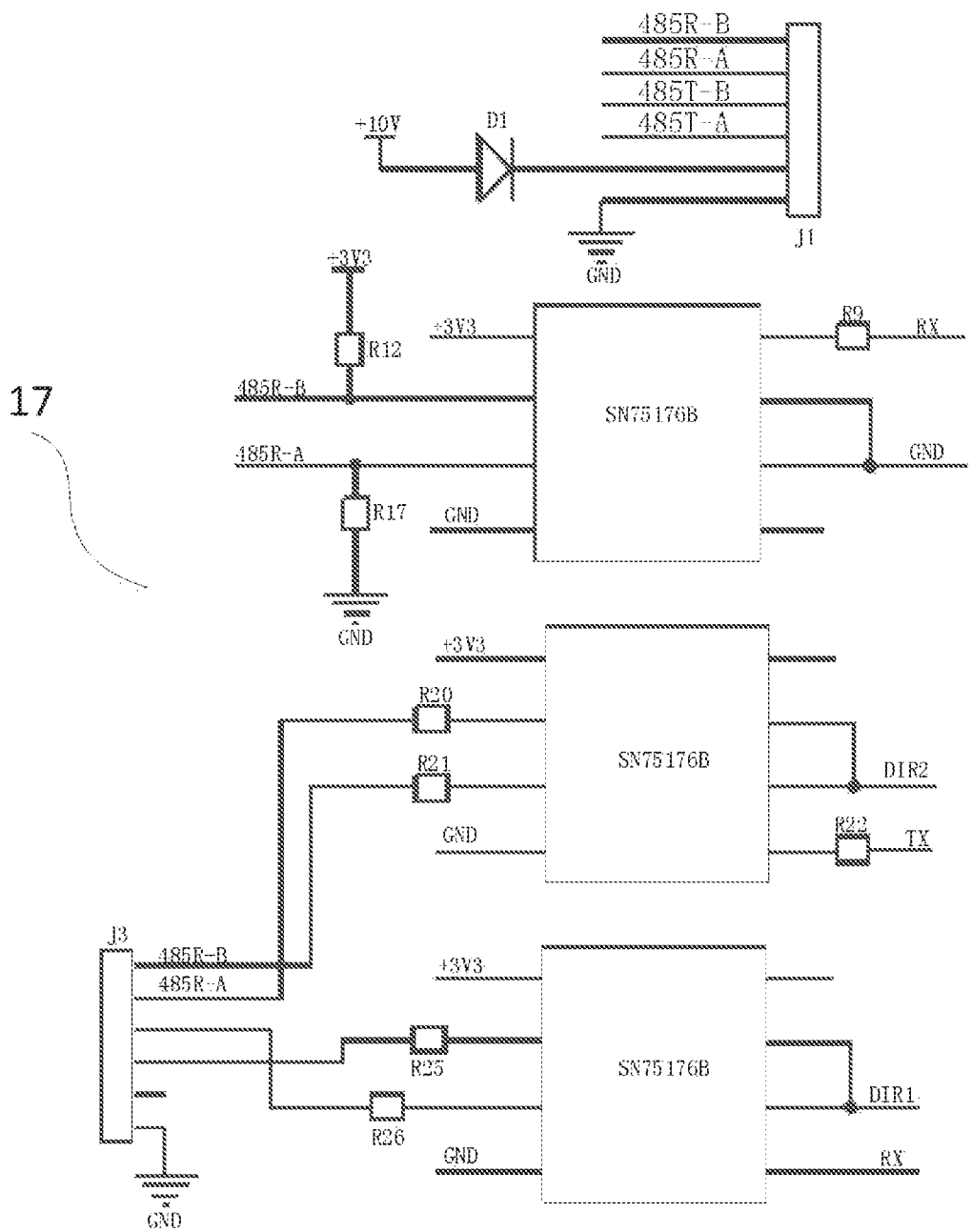
FIG. 7 is a principle diagram of a conversion circuit according to the disclosure.
Figure 8:
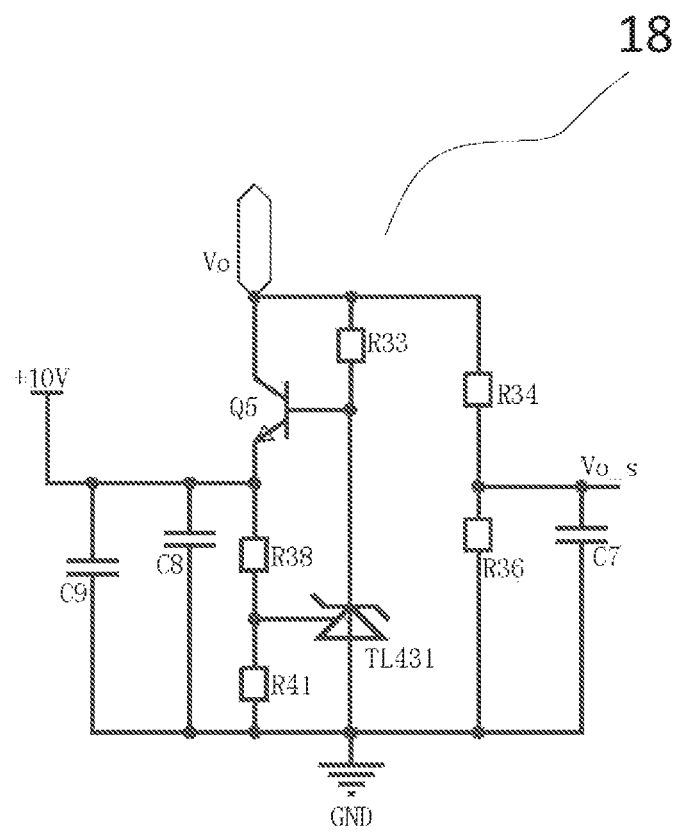
FIG. 8 is a principle diagram of a voltage detection circuit according to the disclosure.
Figure 9:
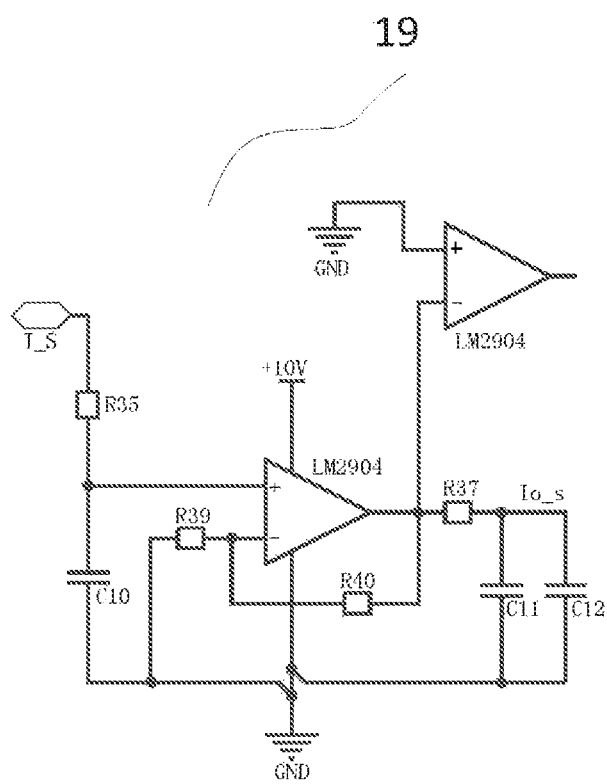
FIG. 9 is a principle diagram of a current detection circuit according to the disclosure.
Figure 10:
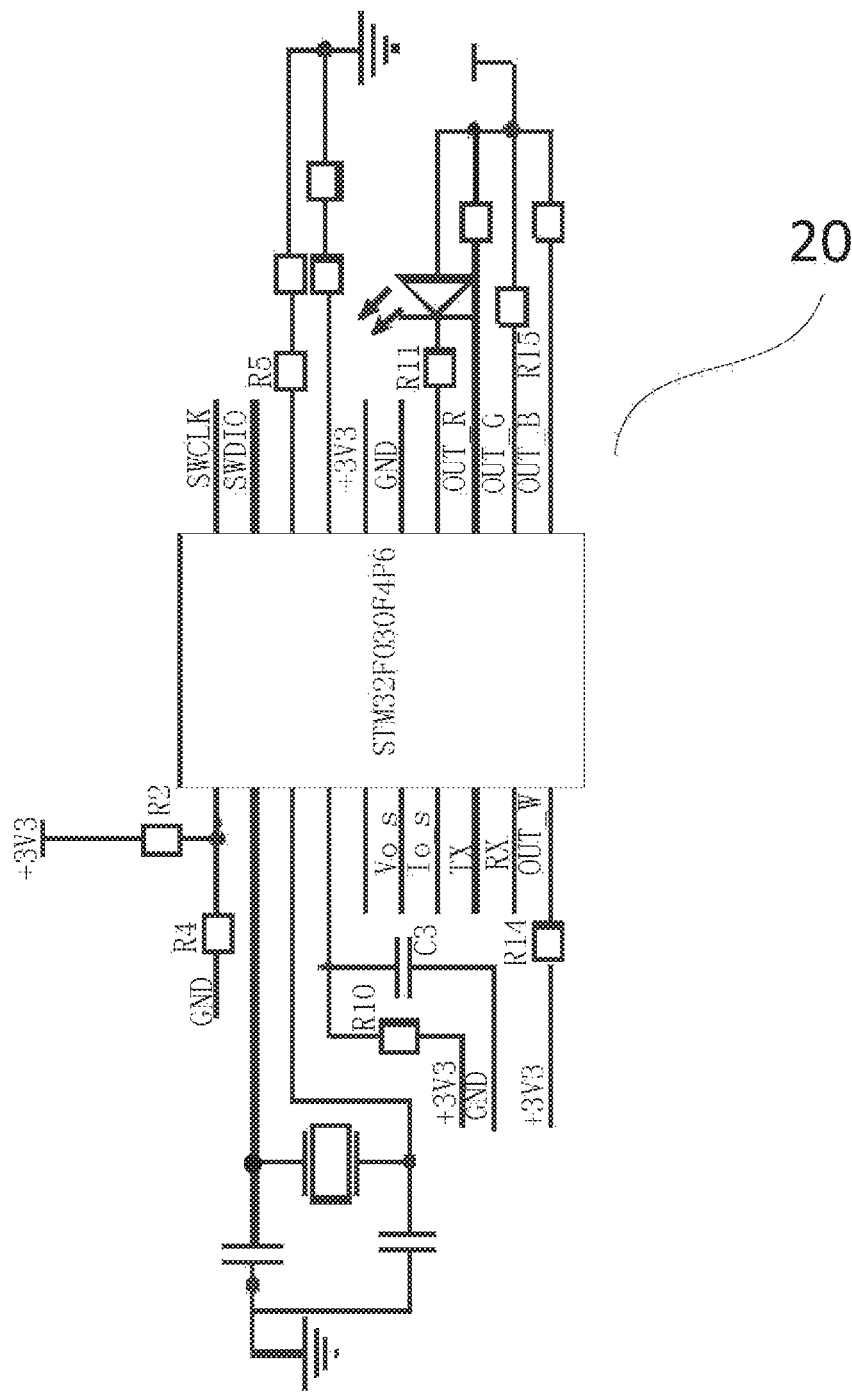
FIG. 10 is a principle of a microprocessor for processing the results of the voltage detection circuit and the current detection circuit according to the disclosure.
Figure 11:
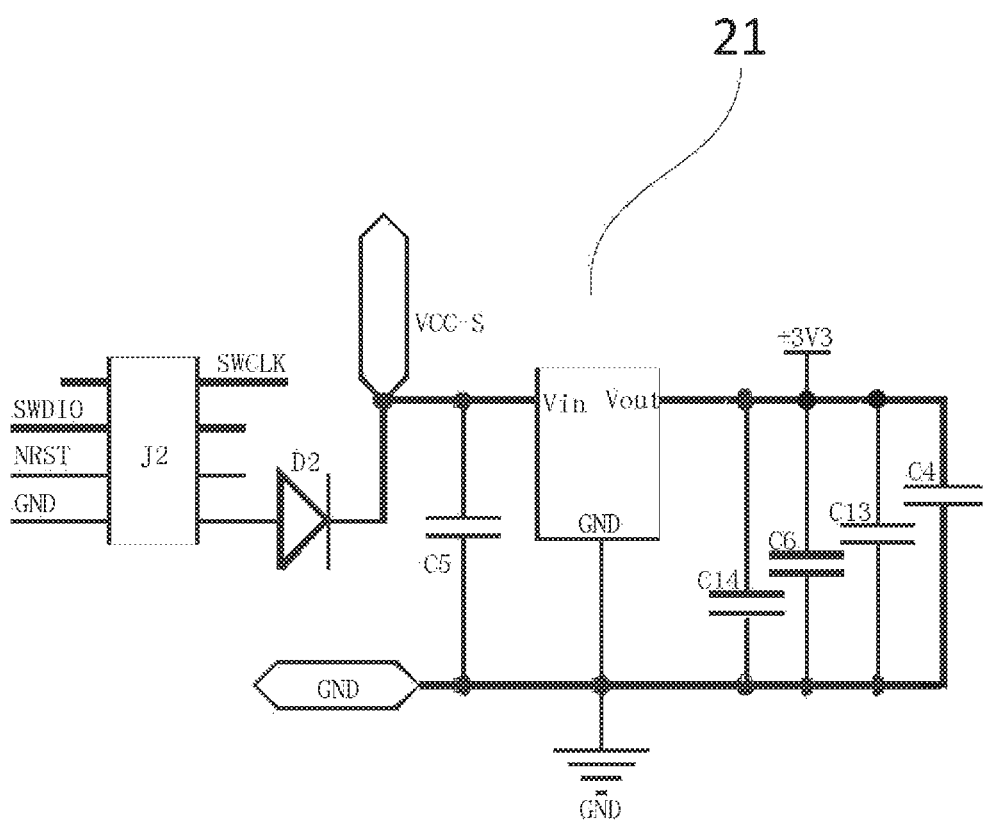
FIG. 11 is a principle diagram of a second supply circuit according to the disclosure.
Figure 12:
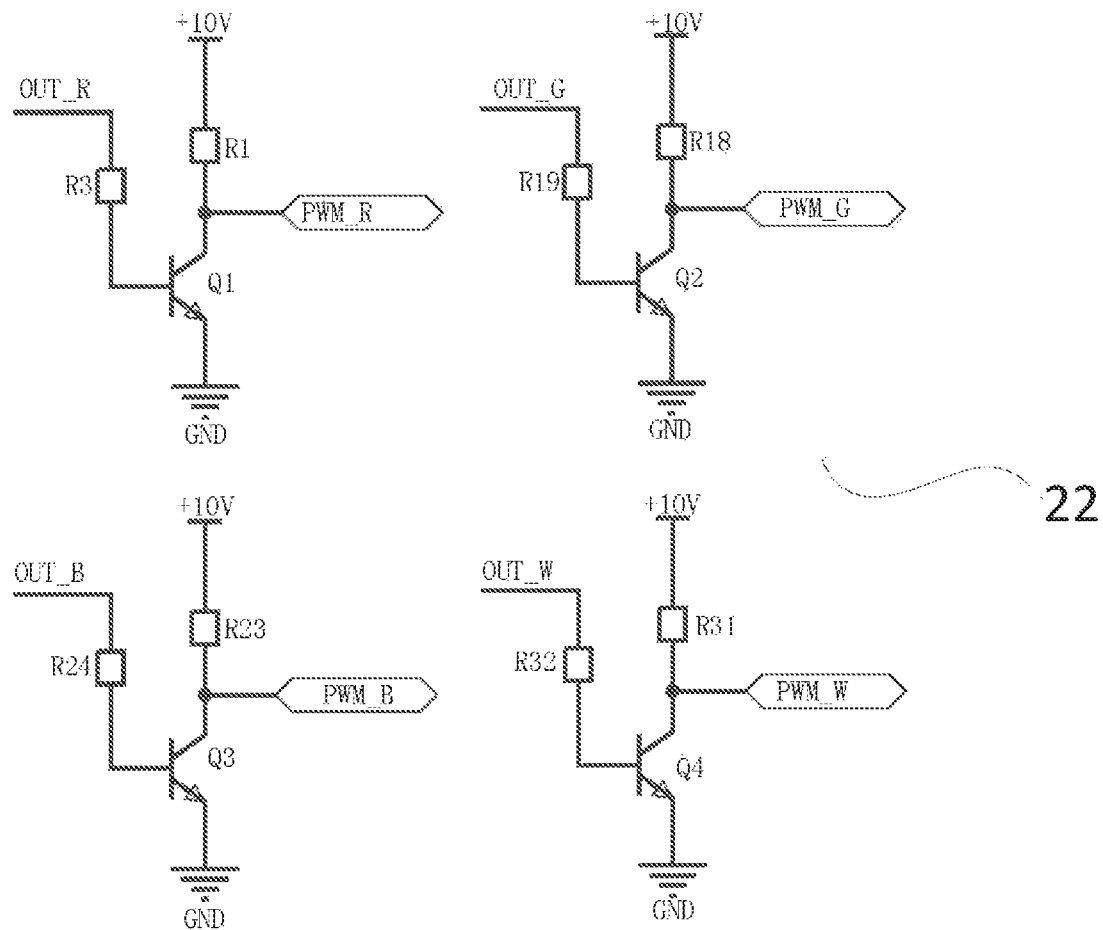
FIG. 12 is a principle diagram of a drive circuit of a MOSFET for light intensity adjustment according to the disclosure.

As shown in FIG. 1-FIG. 12, a system for controlling LED lightbox power supplies 3 disclosed by the disclosure mainly includes: the lightbox power supplies 3 connected in series with one another and disposed inside a lightbox 1, a wireless communication device 4 connected With the lightbox power supplies 3 via a 485 communication bus, and a sensor set 6, a gateway device 5 and a remote server 7 which are located outside the LED lightbox 1. The sensor set 6 is mounted on the shell of the LED lightbox 1 for detecting the surrounding environment conditions of the LED lightbox 1 and is connected with the wireless communication device 4 through a sensor access line. The gateway device 5 can be either mounted separately from the LED lightbox 1 or directly mounted on the shell of the LED lightbox 1, is mainly configured to achieve wireless communication between the remote server 7 and the wireless communication device 4 depending on particular environment conditions to transmit a signal from the wireless communication device 4 to the remote server 7 on the Internet and transmit a control signal from the remote server 7 to the wireless communication device 4, and is wirelessly connected with the wireless communication device 4. The remote server is configured to store all the work condition information of the LED lightbox 1 and send a new control signal of the management party to the LED lightbox 1, for example, for turning off the lightbox power supplies 3, turning on the lightbox power supplies 3, decreasing the output voltage, and increasing the output current, etc.

Particularly, the wireless communication device 4 is selected to be the Zigbee wireless communication node and includes a Zigbee radio frequency chip 8, a four-channel digital isolator 9 connected with the Zigbee radio frequency chip, an alternating-current input parameter detection circuit 10 connected with the four-channel digital isolator 9, a signal conversion circuit 11 respectively connected with the Zigbee radio frequency chip 8 and the light bars 2, and a first supply circuit 12 respectively connected with the Zigbee radio frequency chip 8, the four-channel digital isolator 9, the alternating-current input parameter detection circuit 10 and the signal conversion circuit 11.

Based on actual demand, the LED lightbox 1 is internally equipped with a plurality of LED light bars 2 each of which is provided with an independent driving power supply 3. In order to achieve uniform remote management, all the lightbox power supplies 3 are connected in series with one another via the 485 communication bus. Inside each lightbox power supply 3, a voltage detection circuit 18 and a current detection circuit 19 are provided for real-time detection of output conditions of each lightbox power supply 3. The microprocessor 20 is configured to comprehensively analyze and process to determine whether the lightbox power supply 3 is damaged. In order to ensure independent operation of the voltage detection circuit 18 and the current detection circuit 19, an independent second supply circuit 21 is provided for the lightbox power supply 3 to avoid that the lightbox power supply cannot work due to its damage. The processing result of the microprocessor 20 is converted into the 485 communication signal via the conversion circuit 17, and the signal is transmitted to the wireless communication device 4 and further transmitted to the remote server 7 through the gateway device 5. The management party knows the current work condition of the LED lightbox which functions as a reference for the management party to determine whether the lightbox power supply is damaged, thereby avoiding a trouble that the maintenance personnel must arrive at the field to know whether the LED lightbox 1 is normal, greatly reducing the later management workload of outdoor application of the LED light box, reducing the operation cost of the user, and improving timelessness of finding malfunction and overhauling.

Preferably, the voltage detection circuit 18 comprises a MOSFET for light intensity adjustment and a driving circuit 22 of the MOSFET for light intensity adjustment.

Preferably, the microprocessor 20 is further connected with a driving circuit 22 of the MOSFET for light intensity adjustment.

Preferably, the MOSFET for light intensity adjustment is a PWM four-channel MOSFET for light intensity adjustment.

In order to comprehensively detect the surrounding environment conditions of the LED lightbox, plurality sets of the sensors may be provided; all the sets are mounted at different positions of the shell of the LED lightbox and each set may include a plurality of different sensors, such as a temperature sensor, a humidity sensor and an illumination sensor. In this example, the sensor set includes a temperature and humidity sensor 13, an illumination detection circuit 14, a clock module 15 and a storage module 16 which are respectively connected with the Zigbee radio frequency chip 8, and the temperature and humidity sensor 13, the illumination detection circuit 14, the clock module 15 and the storage module 16 are further respectively connected with the first supply circuit 12.

The specific control method of the disclosure is as follows:

(1) detecting output voltage and output current of a lightbox power supply in real time by a voltage detection circuit and a current detection circuit, and detecting environment information of a lightbox in real time through the temperature and humidity sensor and the illumination sensor;

(2) analyzing and determining whether the lightbox power supply malfunctions by the microprocessor according to the output voltage and the output current of the lightbox power supply, and determining whether the lightbox power supply is suitable for continuing work according to the environment information of the lightbox;

(3) converting a serial port signal of the microprocessor into a 485 communication signal by a conversion circuit, and transmitting the determination result of the microprocessor to a gateway device through a wireless communication device, and updating the determination result to an Internet by the gateway device; and (4) registering a server on an Internet by an LED lightbox management party to remotely grasp a current state of the lightbox power supply, and deciding whether to turn off the lightbox power supply according to the determination result of the microprocessor, wherein, maintenance personnel are scheduled for overhauling if the lightbox power supply has malfunctioned.

The system for controlling the LED lightbox power supplies provided by the disclosure is simple in principle and easy for implementation, is capable of timely finding potential safety hazard possibly existing in the LED lightbox, allows the management party to timely grasp the surrounding environment condition of the LED lightbox, provides a timely and reliable basis for determining whether the LED lightbox continues working and whether the LED lightbox needs overhauling, greatly improves the service life of the LED lightbox, and has a high practical value.

The above examples are only preferred examples of the disclosure, but are not intended to limit the protection scope of the disclosure. Any variations made by adopting the design principle of the disclosure without any creative effort based on above examples are all included within the protection scope of the appended claims.

I claim:

1. A system for controlling LED lightbox power supplies, comprising:

the lightbox power supplies disposed inside a lightbox and correspondingly connected with LED light bars one by one, wherein, each of the lightbox power supplies are connected in series with one another via a communication bus, each of the lightbox power supplies is connected to one of the LED light bars, each of the light bars is controlled to be on and off independently by one of the lightbox power supplies;

a wireless communication device connected in series with the lightbox power supplies via the communication bus is further mounted inside the lightbox;

a gateway device, configured to transmit a signal from the wirelessly communication device to a remote server and transmit a control signal from the remote server to the wireless communication device, is wirelessly communicated with the wireless communication device and the remote server and arranged outside the lightbox;

a sensor set connected in a wired manner with the wireless communication device is arranged on an outer wall of the lightbox for detecting surrounding environment conditions of the LED lightbox;

the remote server stores a work condition information of the lightbox and, based on the information stored, sends new control information to the gateway device; and each of the lightbox power supplies comprises a conversion circuit for converting a serial port signal into a communication signal, a voltage detection circuit for detecting output voltage of the lightbox power supply, a current detection circuit for detecting output current of the lightbox power supply, a microprocessor for processing detection results of the voltage detection circuit and the current detection circuit, and a second supply circuit connected with the microprocessor for allowing the voltage detection circuit and the current detection circuit to operate independent from the lightbox power supplies;

wherein, the wireless communication device is a Zigbee wireless communication node and comprises a Zigbee radio frequency chip, a four-channel digital isolator connected with the Zigbee radio frequency chip, an alternating-current input parameter detection circuit connected with the four-channel digital isolator, a signal conversion circuit respectively in electric connection with the Zigbee radio frequency chip and the light bars, and a first supply circuit respectively connected with the Zigbee radio frequency chip, the four-way digital isolator, the alternating-current input parameter detection circuit and the signal conversion circuit.

2. The system of claim 1, wherein, the sensor set comprises a temperature and humidity sensor, an illumination detection circuit, a clock module and a storage module which are respectively connected with the Zigbee radio frequency chip, and the temperature and humidity sensor, the illumination detection circuit, the clock module and the storage module are also respectively connected with the first supply circuit.

3. The system of claim 1, wherein, the voltage detection circuit comprises a MOSFET for light intensity adjustment and a driving circuit of the MOSFET for light intensity adjustment.

4. The system of claim 3, wherein, the microprocessor is further connected with a drive circuit of the MOSFET for light intensity adjustment.

5. The system of claim 4, wherein, the MOSFET for light intensity adjustment is a PWM four-channel MOSFET for light intensity adjustment.

* * * * *